Feb. 17, 1925.

J. LOMBARDO 1,526,483

ADJUSTABLE CHAIN TIGHTENER

Filed Oct. 8, 1924

Inventor
Joseph Lombardo
By his Attorney

Patented Feb. 17, 1925.

1,526,483

UNITED STATES PATENT OFFICE.

JOSEPH LOMBARDO, OF BERWIND, COLORADO.

ADJUSTABLE CHAIN TIGHTENER.

Application filed October 8, 1924. Serial No. 742,318.

*To all whom it may concern:*

Be it known that I, JOSEPH LOMBARDO, a citizen of the United States, residing at Berwind, in the county of Las Animas and State of Colorado, have invented certain new and useful Improvements in Adjustable Chain Tighteners, of which the following is a specification.

This invention relates to improvements in chain tightening tools, and more particularly to such chains as are used in connection with vehicle wheels to impart an effective tractive grip and prevent skidding.

One of the objects of the invention is to provide a chain tightener that is extremely simple, both to construct and operate, and which may be readily applied and used.

Another aim is in the provision of a chain tightener that can be adjusted in length within reasonable limits so that it may be used on chains of variable length.

A further purpose is to produce a chain tightener capable of being folded compactly when not in use, and so arranged that when in operation as to clear the hub and other parts of the wheel making it unusually safe and easy to operate.

These several objects are attained by the novel construction, combination and arrangement of parts hereinafter described and shown in the accompanying drawing, forming a material part of this disclosure, and in which:—

Figures 1, 2, 3:
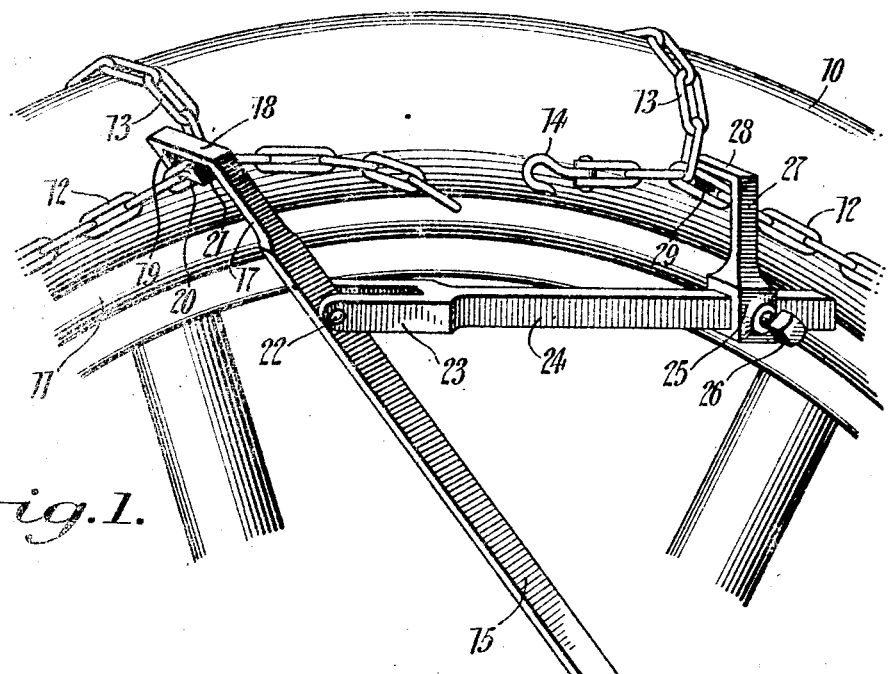
Figure 1 is a perspective view of an embodiment of the invention, illustrating its application.
Figure 2 is a fragmentary side view of one of the chain link engaging jaws.

Figure 3 s a similar view of the adjusting jaw.

Referring in detail to the drawing, the numeral 10 designates generally a tire disposed on the rim 11 of a conventional type of wheel, on which is a non-skid device composed of side chains 12, connected at intervals by cross-chains 13 passing over the peripheral surface of the tire 10.

Such chains are ordinarily provided with pivoted hooks 14 suited to engage in the links at the opposite end of the chain, so that the same may be held securely and tautly in operative position.

The invention resides in the tightener provided for this purpose, the present embodiment of which consists of a rigid bar, having a cross-piece or handle 16 at its outer end.

The operative end 17 of the bar is preferably reduced in width and bent at a right angle, as at 18, for a short distance in order that the handle portion may readily clear the hub or other laterally extending portions of the wheel, thus avoiding bruising the hand of an operator and for the further purpose of permitting a relatively long sweep of the bar in operating.

The end 19 of the right angled element 18 is bent downward, parallel with the portion 17, turned inwardly as at 20 and terminates in a raised lug 21, the arrangement presenting in effect a hook capable of being engaged in any of the chain links, preferably closely adjacent and rearward of the cross-chain as shown best in Figure 1.

Secured by a pivot pin 22 to the bar 15, near its reduced portion, is a fork 23 formed on the end of a bar 24, and slidably engaged on the bar 24 is a head 25 that can be held rigidly in adjustment by a clamp screw 26 as shown.

An integral extension 27 from the head is bent at a right angle 28 and then downturned at 29, similar to the elements 17, 18 and 19 of the hook at the end of the bar 15, but being open at the bottom as shown in Figure 3.

In operation, the hook at the end of the bar is entered in the link of the chain, preferably the link in which the cross-chain is engaged, and the bar 15 moved towards the right hand.

The opposite hook, carried by the head 25, is disposed over the opposite end of the chain 12, preferably just back of the adjacent cross-chain, and the head 25 rigidly clamped to the pivoted bar 24 by the screw 26, whereupon it will be obvious that moving the bar 15 towards the left hand will bring the ends of the chain 12 into position to engage the chain hook 14 with one of the chain links, after which the tightener may be relaxed and removed, leaving the chain in a taut position.

Having thus described my invention and set forth the manner of its construction and operation, what I claim as new and desire to secure by Letters Patent, is:—

1. A chain tightener comprising a bar having a laterally offset portion shaped to present a hook engageable in the links of a chain, said hook terminating in a raised lug to permit the entrance of a link, a bar having a fork pivoted to the first named bar, a head adjustable on the second named bar, means for clamping the head to the bar, and a raised projection on said head, said projection being bent to engage over the links of the chain and make lateral contact with a cross chain.

2. A chain tightener comprising a bar having a laterally offset portion shaped to present a hook engageable in the links of a chain, said hook terminating in a raised lug to permit the entrance of a link, a fork bar pivoted to the first named bar, a head slidable on said forked bar, means for securing the head in adjustment, a cross-handle on the first named bar, and means integral with said head to engage over the links of a chain adjacent a cross-chain connected therewith.

In witness whereof I have affixed my signature.

JOSEPH LOMBARDO.